(12) United States Patent
Stephens et al.

(10) Patent No.: US 10,519,617 B2
(45) Date of Patent: Dec. 31, 2019

(54) SAND BOIL FILTER

(71) Applicant: United States of America as Represented by The Secretary of The Army, Alexandria, VA (US)

(72) Inventors: Isaac J Stephens, Vicksburg, MS (US); Bryant A Robbins, Denver, CO (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 15/910,732

(22) Filed: Mar. 2, 2018

(65) Prior Publication Data

US 2019/0271129 A1    Sep. 5, 2019

(51) Int. Cl.

| | |
|---|---|
| *E02D 3/10* | (2006.01) |
| *E02D 3/00* | (2006.01) |
| *C02F 1/00* | (2006.01) |
| *B01D 29/11* | (2006.01) |
| *B01D 29/15* | (2006.01) |

(Continued)

(52) U.S. Cl.
CPC ............. *E02D 3/00* (2013.01); *B01D 29/11* (2013.01); *B01D 29/15* (2013.01); *B01D 35/02* (2013.01); *C02F 1/004* (2013.01); *E02D 3/10* (2013.01); *E02D 29/00* (2013.01); *B01D 2201/02* (2013.01); *B01D 2201/0461* (2013.01); *C02F 2103/06* (2013.01); *E02D 2200/1692* (2013.01);

(Continued)

(58) Field of Classification Search
CPC .. E02D 3/00; E02D 3/10; E02D 29/00; E02D 2200/1692; E02D 2600/30; E02B 8/00; E02B 11/00; B01D 29/114; B01D 29/15; B01D 35/02; B01D 2201/02
USPC ...... 210/170.07, 497.3, 747.7; 405/36, 302.4
See application file for complete search history.

(56) References Cited

U.S. PATENT DOCUMENTS

| | | | | |
|---|---|---|---|---|
| 1,155,852 A | * | 10/1915 | Westergren ............ | B01D 35/02 210/448 |
| 2,460,084 A | * | 1/1949 | Hebo ..................... | B01D 29/15 210/356 |

(Continued)

FOREIGN PATENT DOCUMENTS

| | | | |
|---|---|---|---|
| JP | 8-311860 | * | 11/1996 |
| JP | 2013-79544 | * | 5/2013 |

(Continued)

*Primary Examiner* — Christopher Upton
(74) *Attorney, Agent, or Firm* — Brian C. Jones

(57) ABSTRACT

In certain embodiments, a sand-boil filter includes a hollow, conical, water-porous structure made of a mesh material having spaced mesh holes. The filter is inserted narrow-end down into a sand boil to allow water to flow from the ground through the mesh material and out the top of the sand boil, while blocking solid matter larger than the mesh holes from passing through the mesh material. In some implementations, the filter is filled with gravel that holds the filter in place while allowing water to flow out of the sand boil. Such filters prevent sand boils from growing while relieving the underground hydrostatic pressure that created the sand boil in the first place and inhibiting subterranean erosion that can cause failure of a nearby levee. The conical shape provides relatively large surface area that inhibits clogging and allows each filter to be used for a range of different sand-boil sizes.

16 Claims, 7 Drawing Sheets

(51) Int. Cl.
*E02D 29/00* (2006.01)
*B01D 35/02* (2006.01)
*C02F 103/06* (2006.01)

(52) U.S. Cl.
CPC .. *E02D 2300/0075* (2013.01); *E02D 2600/30* (2013.01)

(56) References Cited

U.S. PATENT DOCUMENTS

| | | | | | |
|---|---|---|---|---|---|
| 2,865,511 | A | * | 12/1958 | Hopkins, Jr. | B01D 29/15 210/497.3 |
| 3,872,012 | A | * | 3/1975 | Endicott | B01D 35/02 210/297 |
| 6,261,445 | B1 | * | 7/2001 | Singleton | B01D 29/15 210/170.03 |
| 7,615,148 | B1 | * | 11/2009 | Gentry | B01D 35/02 210/170.07 |
| 2011/0266201 | A1 | * | 11/2011 | Perez | E02D 29/00 210/171 |

FOREIGN PATENT DOCUMENTS

| | | | |
|---|---|---|---|
| JP | 2015-17362 | * | 1/2015 |
| JP | 2016-172980 | * | 9/2016 |
| JP | 2017-155586 | * | 9/2017 |

* cited by examiner

520

SAND BOIL FILTER

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to sand boils and more particularly to techniques for controlling sand boils.

Description of the Related Art

This section introduces aspects that may help facilitate a better understanding of the invention. Accordingly, the statements of this section are to be read in this light and are not to be understood as admissions about what is prior art or what is not prior art.

A sand boil is an eruption of a liquefaction of sediment (e.g., sand) and water through a bed of sediment due, for instance, to differences in water pressure on two sides of a levee (or other water-retaining structure such as a dam) which causes liquefied sediment and water to flow from beneath the levee and out of a sand boil on the land side of the levee. If left unchecked, a sand boil can continue to grow in size, thereby decreasing the effectiveness of the levee in preventing water from reaching the land side. Moreover, an unchecked sand boil can result in internal erosion of the foundation soils underneath the levee that can create one or more channels or pipes through the levee embankment. The creation of channels and pipes can quickly pick up pace and eventually result in failure of the levee.

FIG. 1 is a cross-sectional side view of a typical sand boil 110 on the land side 120 of a nearby levee 130. As represented by the long curved arrows in FIG. 1, water from the water side 140 of the levee 130 percolates through the soil 150 under the levee and erupts out of the sand boil 110 as a liquefaction of sediment and water. Although not explicitly shown in FIG. 1, a sand boil typically has a substantially circular opening at ground level that can vary in diameter from pin-hole size to a few feet in diameter. Left unchecked, sand boils have been known to grow even larger.

A sand boil is difficult to stop. The most-common method for controlling an existing sand boil is to form a body of water above the boil to create enough pressure to slow or stop the flow of water through the boil. A sufficiently slow flow of water will slow movement of liquefied soil, thereby inhibiting or slowing significant erosion under a nearby levee. Such a body of water is most often created by surrounding the sand boil with a ring of stacked sandbags, such that the water level within the ring will rise, thereby increasing the underground hydrostatic pressure at the sand boil and decreasing the flow of water and sand out of the sand boil. Unfortunately, this method is labor intensive and costly, and the increased hydrostatic pressure in the ground near the sand boil can result in the formation of one or more new sand boils nearby.

Another conventional technique for forming a body of water above a sand boil is to place an open-ended barrel over the boil. The seeping water will fill up at least a portion of the barrel, thereby creating the body of water above the boil. Here, too, as in the case of a ring of sand bags, although the body of water may slow the flow of liquefied sediment through the existing sand boil, the increased underground hydrostatic pressure can result in the formation of new, nearby sand boils.

Another known technique for controlling sand boils is to dump large amounts of material such as sand and gravel over the entire area impacted by existing sand boils and threatened by new sand boils. This typically involves the labor intensive, expensive, and time consuming use of dump trucks to bring the material from a remote storage location to the site and bull dozers to distribute the material over the relevant area.

SUMMARY

Problems in the prior art are addressed in accordance with the principles of the present invention by employing a sand-boil filter to inhibit the growth of a sand boil.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including." specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
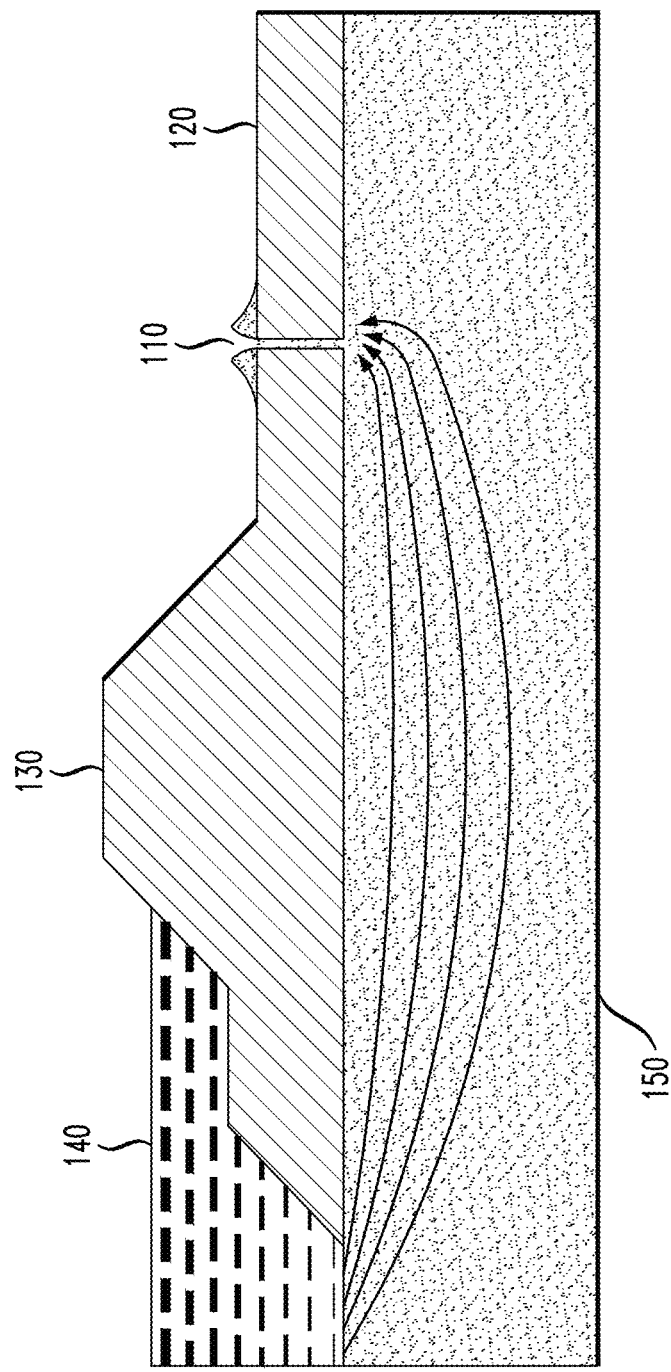
FIG. 1 is a cross-sectional side view of a typical sand boil on the land side of a nearby levee.
Figure 2:
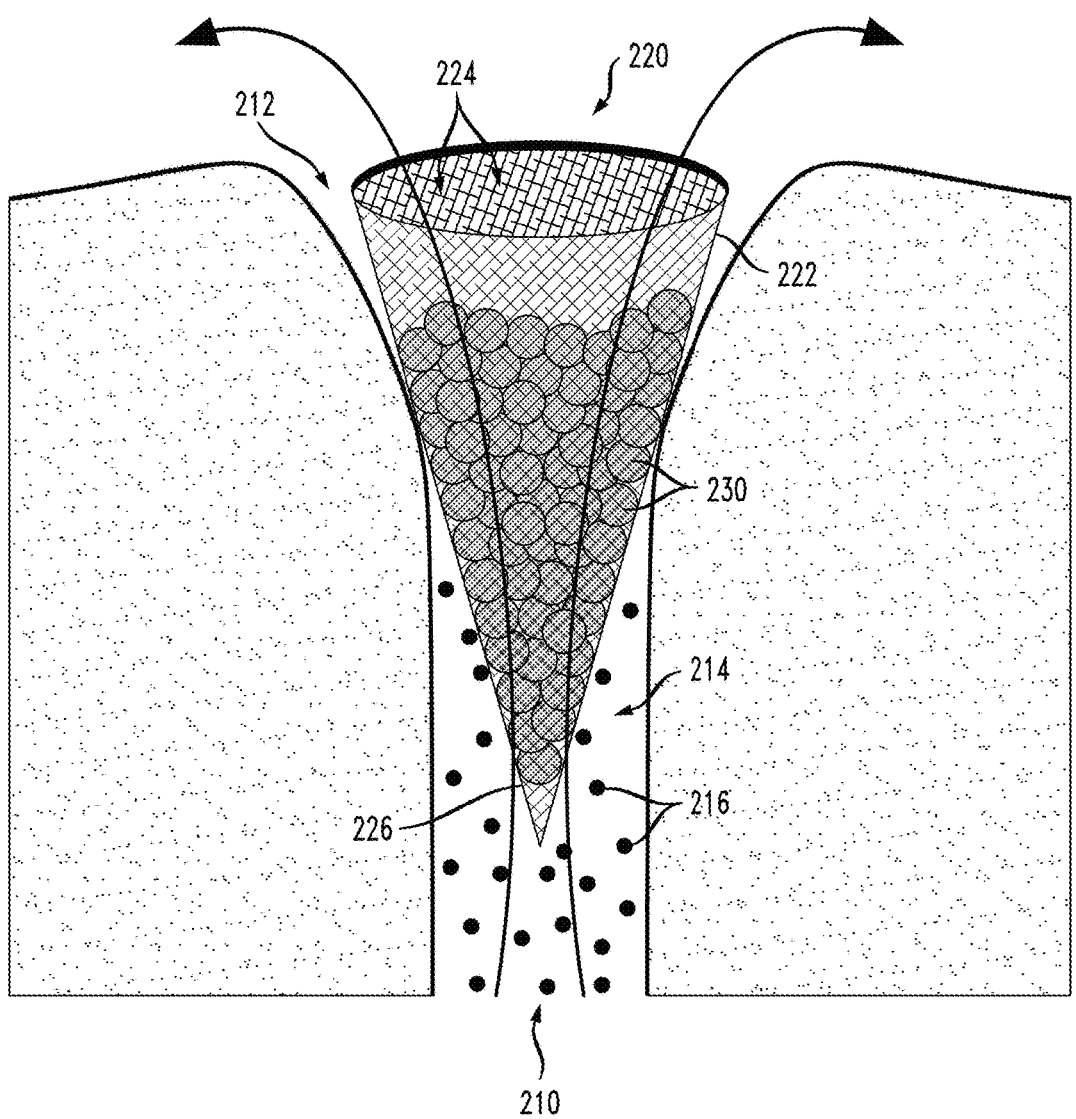
FIG. 2 is a representation of a sand-boil filter according to one embodiment of the invention.

FIG. 2 is a representation of a sand-boil filter 220 deployed to control an existing sand boil 210 according to one embodiment of the invention. In this embodiment, the sand-boil filter 220 is a water-porous structure 222 having a hollow, conical shape and made of a mesh material having an array of mesh holes 224. The size, number, and location of the mesh holes 224 are designed to allow water to flow relatively freely through the mesh material while preventing solid material such as typically-sized sand particles 216 from passing through the mesh material. The mesh material can be, for example, any suitable, flexible or rigid, synthetic or natural, woven or non-woven fabric, such as (without limitation) US 670 Woven Filtration fabric from US Fabrics, Inc. of Cincinnati, Ohio, or Mirafi 140N Nonwoven Geotextile from TenCate of Almelo, Netherlands.

As indicated in FIG. 2, to deploy the sand-boil filter 220 into the sand boil 210, the cone-shaped filter is inserted narrow end 226 down through the substantially circular sand-boil opening 212 at ground level and into the substantially cylindrical throat 214 of the sand boil. Before and/or after inserting the filter 220 into the sand boil 210, gravel (symbolically represented in FIG. 2 as round rocks 230) is placed within the hollow interior of the filter. The weight of the gravel is intended to offset any vertical water pressure that might otherwise tend to push the filter 220 out of the hole, thereby maintaining the positioning of the filter 220 within the sand-boil throat 214. In addition, when the structure 222 is made of a flexible, mesh material, the gravel maintains the structure's cylindrical shape in order to wedge the cylindrical structure against the sand boil's cylindrical throat 214, thereby providing a friction fit that keeps the inserted filter 220 in place within the sand boil 210. The gravel is composed of rocks 230 of suitable shapes and sufficiently large sizes to allow water that enters the filter interior through the mesh material to flow relatively freely up through the gaps between the gravel rocks and out the sand-boil opening 212 at ground level (as represented in FIG. 2 by the two long arrows). When the sand-boil filter 220 is made of a flexible mesh material, the gravel also prevents the flexible filter from collapsing, thereby maintaining the filter's conical shape. Note that gravel is just one type of material that can be placed within the hollow interior of the sand-boil filter 220 as a mechanical restraining structure. Any other suitable materials that provide anchoring weight while allowing water to flow may be used instead of or in addition to gravel.

The mesh material of the sand-boil filter 220 inhibits sand 216 (or other sediment) from passing into the interior of the filter and out the ground-level opening of the sand boil 210. The filter allows water to flow out of an existing sand boil, while inhibiting the sand boil from growing larger by limiting both (i) the rate of water and liquefied sediment flowing out of the sand boil and (ii) the erosion of the foundation soil under the levee. Moreover, because the sand-boil filter 220 allows water to escape from the sand boil 210 at ground level, the underground hydrostatic pressure at the sand boil will not be increased as it is when a body of water is formed over an existing sand boil using a sandbag ring or a filtering barrel. As a result, using the sand-boil filter 220 instead of a sandbag ring or a filtering barrel inhibits the creation of new sand boils nearby.

Because the sand-boil filter 220 has a conical shape, a particular instance of the filter can be used to control sand boils having a range of different diameters, with the magnitude of a particular sand-boil diameter dictating how far into the sand boil the conical filter can be inserted. In general, the filter should be able to be inserted far enough into a sand boil such that a sufficient amount of the gravel inside the filter is below ground level to maintain the filter in place within the sand boil. Sand-boil filters 220 having different, overlapping sizes can be provided to handle a wide, contiguous range of sand-boil diameters. For a given sand boil, the selected sand-boil filter 220 should have a wide-end diameter that is at least slightly larger than the diameter of the sand boil such that the filter will span the entire horizontal area of the sand-boil throat to (i) provide an anchoring friction fit between the filter and the sand-boil throat and (ii) prevent water and sand from circumventing the filter.

In addition, compared to a flat, circular filter that could, in theory, be placed over a sand boil, the conical sand-boil filter 220 has a larger effective surface area that is less susceptible to clogging with sand and other solid material, thereby promoting the flow of water through the filter and out the top of the sand boil and increasing the effectiveness of relieving the underground water pressure that created the sand boil in the first place.

Prior to use, multiple instances of the conical sand-boil filter 220 can be nested within each other for efficient storage. Furthermore, if the sand-boil filters 220 are made of a flexible mesh material, then the filters can be collapsed by flattening, folding, and/or rolling up, either individually or even in a nested configuration.

The sand-boil filter 220 of FIG. 2 is just one possible design for a conical-shaped sand-boil filter of the invention.

Figure 3:
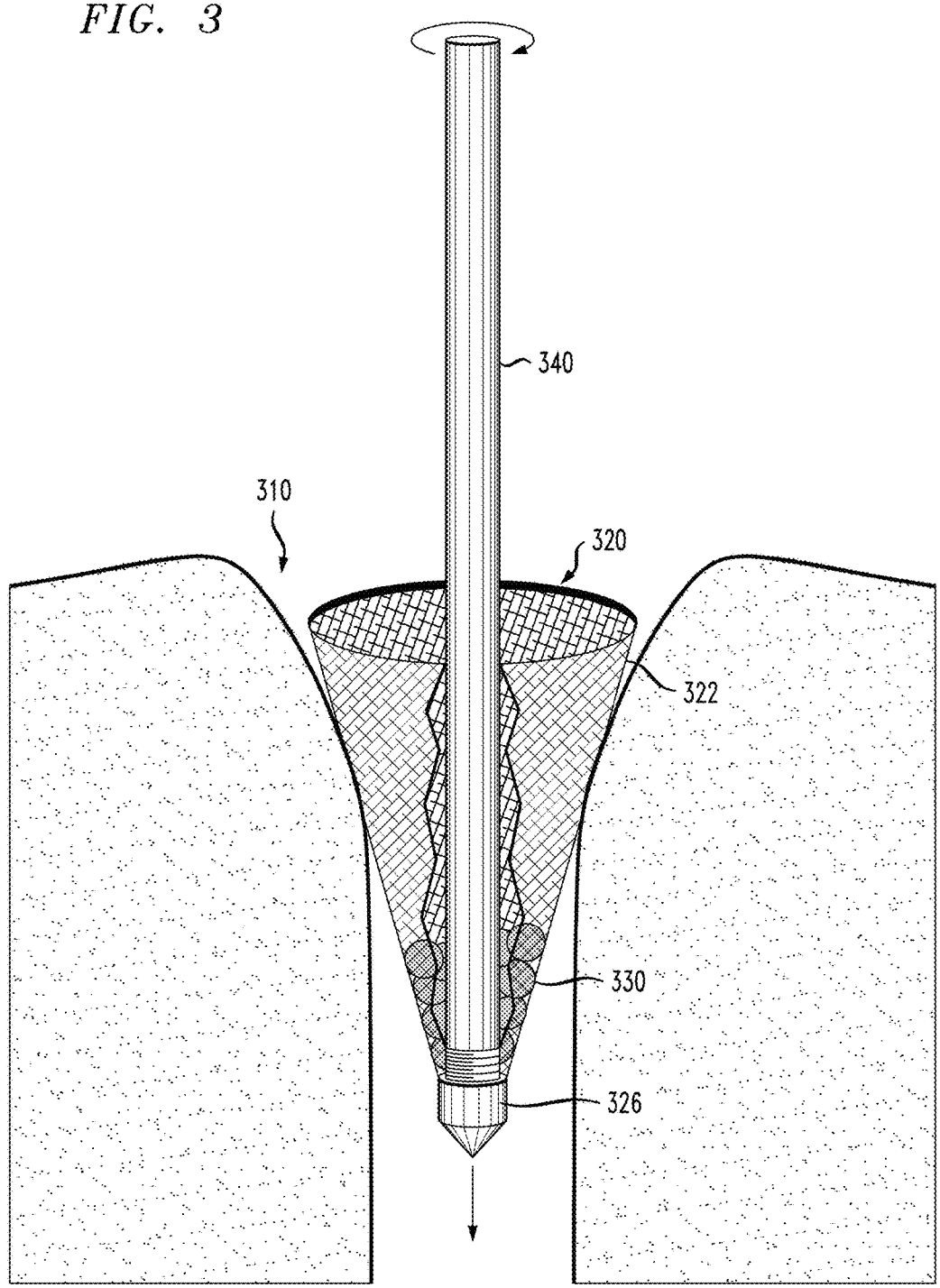
FIG. 3 is a representation of a sand-boil filter according to another embodiment of the invention.

FIG. 3 is a representation of a sand-boil filter 320 according to another embodiment in which the conical, water-porous structure 322 has a (e.g., female) threaded hub 326 at the narrow end. As shown in FIG. 3, the threaded hub 326 can be mated to a corresponding (e.g., male) threaded insertion rod 340 within the interior of the conical structure 322. Once attached, the insertion rod 340 can be used to insert the sand-boil filter 320 down into a sand boil 310 to a certain depth (with or without some gravel 330 already placed within the filter). The insertion rod 340 can then be removed by unscrewing it from the hub 326 and retracting the rod from the sand boil. Gravel (or additional gravel) 330 can then be inserted into the filter.

Note that, in an alternative implementation, the hub 326 and the rod 340 are not threaded. In this implementation, the rod 340 can simply be abutted against the top of the hub 326 to push the filter 320 into a sand boil without the rod being otherwise connected to the hub.

Figure 4A:
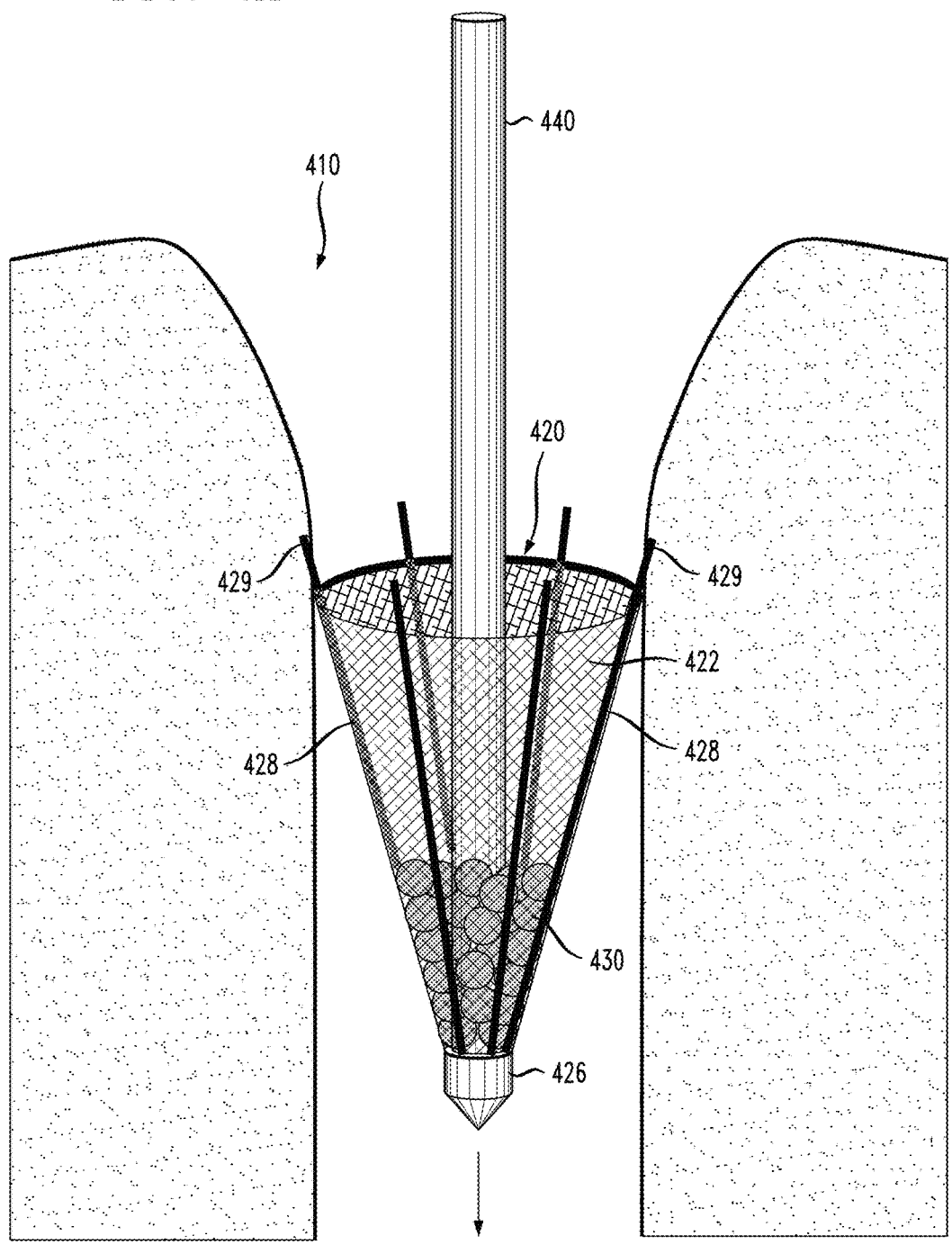
FIGS. 4A-4B are representations of a sand-boil filter according to yet another embodiment of the invention
Figure 4B:
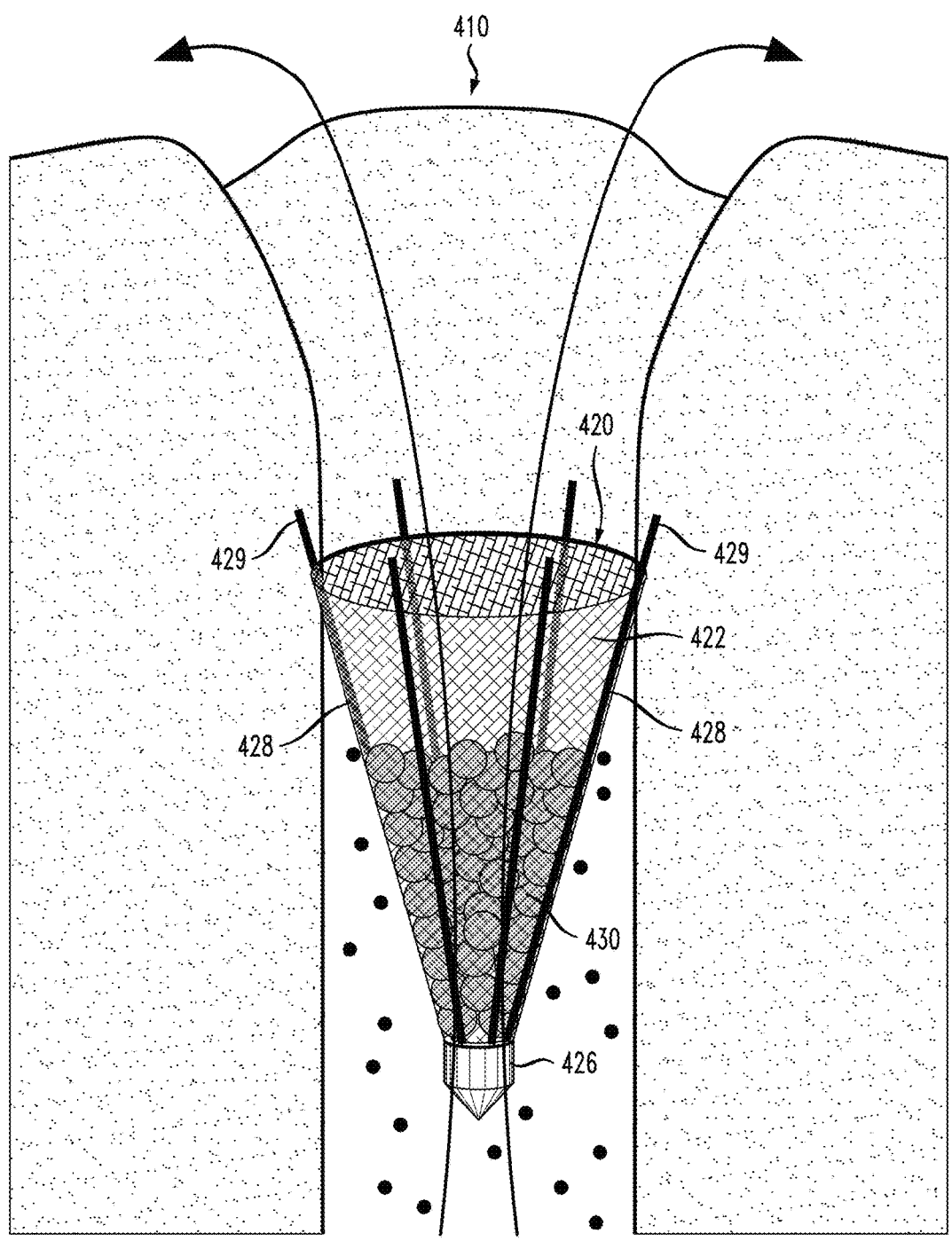

FIGS. 4A and 4B are representations of a sand-boil filter 420 according to yet another embodiment in which a number of substantially rigid, radial arms 428 are attached to the mesh material of the water-porous structure 422 at the threaded hub 426, much like the ribs of an umbrella. The threaded hub 426 is shown in FIG. 4A mated to the corresponding threaded insertion rod 440 within the interior of the conical structure 422. The arms 428 may extend beyond the periphery of the mesh material at the top of the conical structure 422. Depending on the particular implementation, the radial arms 428 can be woven through the mesh material or attached to the mesh material using some other suitable technique.

The attached insertion rod 440 can be used to insert the sand-boil filter 420 down into a sand boil 410 to a certain depth (with or without some gravel 430 already placed within the filter). The attached insertion rod 440 can then be used to pull the filter slightly up to engage the distal ends 429 of the radial arms 428 into the cylindrical side wall of the sand boil, thereby increasing the anchoring of the filter within the sand boil. The insertion rod 440 can then be removed by unscrewing it from the hub 426 and retracting the rod from the sand boil. Gravel (or additional gravel) 430 can then be inserted into the filter. FIG. 4B shows the sand-boil filter 420 after it has been inserted into and anchored within the sand boil 410 by both the gravel 430 and the radial arms 428. Here, the gravel 430 and the radial arms 428 are two different types of restraining structure for the filter. Note that, if the anchoring provided by the arms 428 is sufficient to keep the filter 420 in place within the sand boil, then some or even all of the gravel 430 can be omitted.

Note that here, too, as with sand-boil filter 320 of FIG. 3, the hub 426 and the rod 440 of sand-boil filter 420 need not be threaded. In that case, the rod 440 can be used to insert the filter 420 into the sand boil 410, but will not be able to be used to pull up on the filter to anchor the arms 428 into the sand-boil side wall. Nevertheless, that anchoring may still occur as a result of the upward pressure exerted by the water and liquefied sediment within the sand boil.

In one implementation, the arms 428 are pivotally attached to the hub 426 such that each arm can rotate in a plane that passes through both the arm 428 and the insertion rod 440, again similar to the ribs of an umbrella. In this case, at least some gravel 430 may need to be placed within the filter 420 before the filter is inserted into the sand boil in order to prevent the filter from collapsing during insertion.

In another implementation, the arms 428 are rigidly connected to the hub 426, where the arms 428 are made of a resilient material such as metal. In this case, the arms 428 will bend when the filter 420 is inserted into a sand boil 410 whose opening diameter is smaller than the wide end of the conical filter. In that case, the resiliency of the arms 428 will keep the filter 420 from collapsing when the filter is inserted into a sand boil.

In yet another implementation, the arms 428 are connected to the hub 426 using spring-tensioned expandable restraints that resist collapse of the conical structure, like an automatically opening, spring-loaded umbrella. In this case, the filter 420 may be able to be inserted into the sand boil 410 in its collapsed, closed configuration and allowed to open (e.g., using a suitable release mechanism) after the filter has been inserted into the sand boil.

Figure 5B:
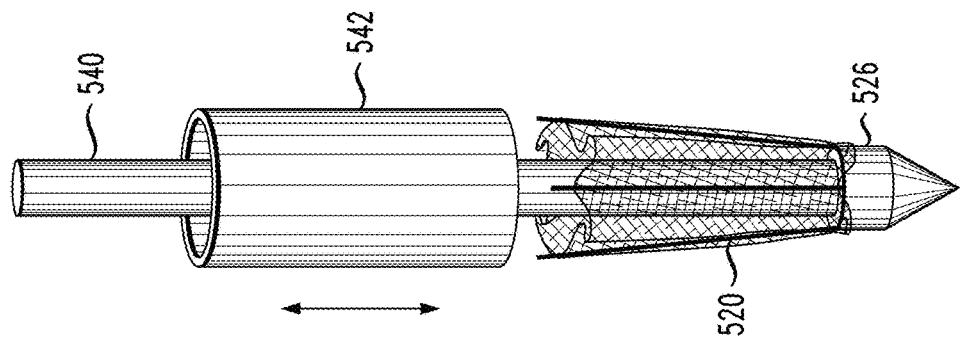
FIGS. 5A-5B are representations of a sand-boil filter according to yet another embodiment.
Figure 5A:
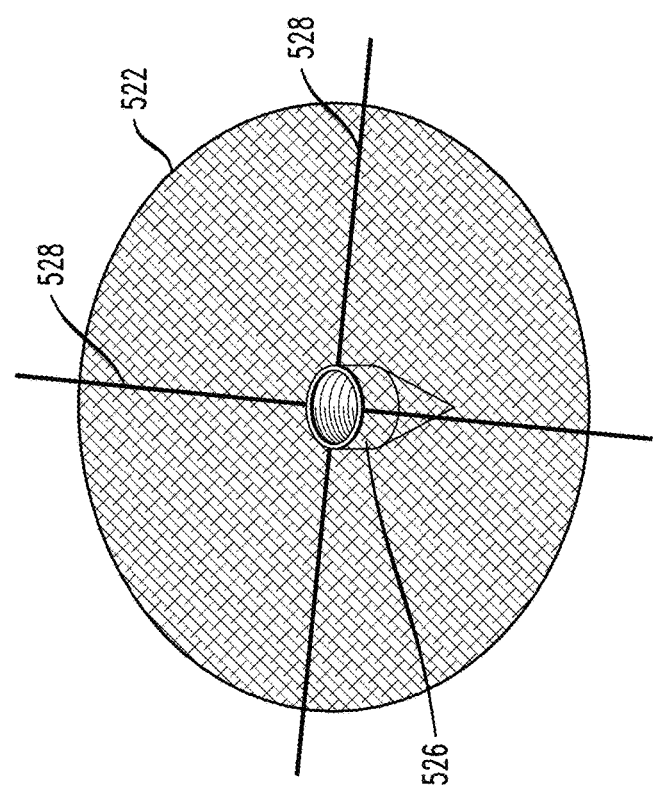

FIGS. 5A and 5B are representations of a sand-boil filter 520 according to yet another embodiment. In this embodiment, the hub 526 is connected to a number of resilient, radial arms 528 that support a circle of mesh material 522. The resilient arms 528 are mated to the hub 526 such that they function as springs that resist being bent away from the open, flat configuration shown in FIG. 5A. As such, the sand-boil filter 520 can be placed over a sand boil with the hub 526 aligned with the center of the sand-boil opening, and an insertion rod, such as those shown in FIGS. 3 and 4A, can be used to push the filter into the sand boil, thereby causing the resilient arms 528 to bend and the filter 520 to assume a substantially conical shape within the cylindrical sand-boil throat.

Alternatively, as represented in FIG. 5B, the insertion rod 540 can be connected to an outer sleeve 542 that receives the sand-boil filter 520 in a folded-up configuration for insertion into a sand boil. After the folded-up filter 520 is inserted into the sand boil, when the insertion rod 540 and the sleeve 542 are withdrawn together from the sand boil, the filter 520 is released from the sleeve 542, thereby allowing the spring-loaded resilient arms 528 to open the filter to span the sand-boil throat.

Multiple instances of the sand-boil filter 520 can be stacked in their open, flat configuration for efficient storage.

Figure 6:
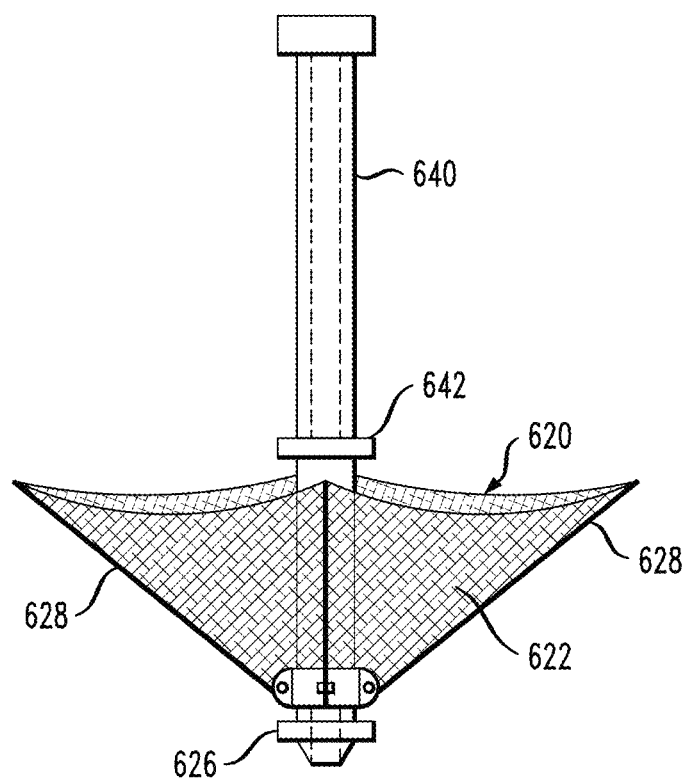
FIG. 6 is a representation of a sand-boil filter according to yet another embodiment.

FIG. 6 is a representation of a sand-boil filter 620 according to yet another embodiment. In this embodiment, the mesh material 622 is supported by a number of spring-loaded radial arms 628 that are rotatably connected to the hub 626. The filter 620 can be inserted into a sand boil using an insertion rod 640 with the filter in either an unfolded configuration or restrained in a folded configuration by a suitable mechanism 642 for release after insertion. The release mechanism can, for example, consist of a mechanical or electrical release controlled by hardware internal to the insertion rod 640 with release tabs protruding through openings in rod 640 at locations where the tips of spring-loaded radial arms 628 touch insertion rod 640 in the fully closed position. When radial arms 628 are pushed closed, the release tabs will engage the arms 628 and restrain them in the closed position. Activation of the mechanical or electrical release hardware will move the release tabs, thereby allowing the arms to spring open.

Sand-boil filters of the invention may provide one or more of the following advantages over the conventional technique of placing a ring of sandbags around a sand boil or a filtering barrel over a sand boil:

Easier to install (e.g., less labor intensive);
Does not raise the water level at the sand boil, thereby inhibiting the creation of additional nearby sand boils;
Relatively lightweight; and
More easily stored and stockpiled.

Although the invention has been described in the context of certain sand-boil filters having specific numbers of radial arms, it will be understand that the invention is not limited to any specific number of radial arms.

In certain embodiments, the invention is a sand-boil filter comprising a water-porous structure having a hollow conical shape and made of a mesh material having a plurality of spaced mesh holes, wherein the water-porous structure is insertable narrow-end down into a sand boil formed in ground to allow water to flow from the ground through the mesh material and out the top of the sand boil, while blocking solid matter larger than the mesh holes from passing through the mesh material and out of the top of the sand boil.

In certain embodiments of the foregoing, the water-porous structure is collapsible for storage.

In certain embodiments of the foregoing, the mesh material is made of a flexible fabric.

In certain embodiments of the foregoing, the filter further comprises a spring-tensioned mechanism that provides the water-porous structure with its hollow conical shape.

In certain embodiments of the foregoing, the filter further comprises restraining structure configured to restrain the water-porous structure from being lifted out of the sand boil.

In certain embodiments of the foregoing, the restraining structure comprises a plurality of weighted objects placed within the hollow conical shape of the water-porous structure, wherein the weighted objects are sized to allow water and sediment smaller than the mesh holes to flow between the weighted objects.

In certain embodiments of the foregoing, the plurality of weighted objects comprises gravel.

In certain embodiments of the foregoing, the restraining structure comprises arms that extend from the narrow end of the conical, water-porous structure beyond the wide end of the conical, water-porous structure to engage with the ground adjacent to the sand boil.

In certain embodiments of the foregoing, the restraining structure is configurable in a closed configuration in which the water-porous structure has a collapsed, non-conical shape.

In certain embodiments of the foregoing, the arms are spring-tensioned.

In certain embodiments, the invention is a method for slowing or preventing a sand boil formed in ground from growing or further eroding sediment. The method comprises (i) allowing water to flow rising from the ground through a mesh material of a hollow, conical, water-porous structure of a sand-boil filter after the water-porous structure has been inserted narrow-end down into the sand boil, the mesh material having a plurality of spaced mesh holes and (ii) blocking, by the mesh material, solid matter larger than the mesh holes from passing from the ground through the mesh material and out of the top of the sand boil.

In certain embodiments of the foregoing, the method further comprises using restraining structure configured to inhibit the water-porous structure from being lifted out of the sand boil.

In certain embodiments of the foregoing, the restraining structure comprises arms that extend from the narrow end of the conical, water-porous structure beyond the wide end of the conical, water-porous structure to engage with the ground adjacent to the sand boil.

In certain embodiments of the foregoing, the water is allowed to flow from the ground through the mesh material and through a plurality of weighted objects placed within the hollow, conical, water-porous structure, wherein the weighted objects are sized to allow the water to flow between the weighted objects.

In certain embodiments of the foregoing, the plurality of weighted objects comprises gravel.

In certain embodiments, the invention is a method for a sand boil formed in ground. The method comprises (i) identifying the sand boil and (ii) inserting, narrow-end down into the opening of the sand boil, a water-porous structure having a hollow conical shape and made of a mesh material having a plurality of spaced mesh holes, wherein the water-porous structure allows water to flow from the ground through the mesh material and out the top of the sand boil, while blocking, by the mesh material, solid matter larger than the mesh holes from passing from the ground through the mesh material and out of the top of the sand boil.

In certain embodiments of the foregoing, restraining structure is configured to inhibit the water-porous structure from being lifted out of the sand boil.

In certain embodiments of the foregoing, the restraining structure comprises arms that extend from the narrow end of the conical, water-porous structure beyond the wide end of the conical, water-porous structure and engage with the ground adjacent to the sand boil.

In certain embodiments of the foregoing, the method further comprises placing a plurality of weighted objects within the hollow, conical, water-porous structure, wherein the weighted objects are sized to allow water to flow between the weighted objects.

In certain embodiments of the foregoing, the plurality of weighted objects comprises gravel.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to Embodiments that (1) are Enabled by this Specification and (2) Correspond to Statutory Subject matter. Non-enabled embodiments and embodiments that correspond to non-statutory subject matter are explicitly disclaimed even if they fall within the scope of the claims.

What is claimed is:

1. A sand-boil filter, comprising:
a water-porous structure having a hollow conical shape and made of a mesh material having a plurality of spaced mesh holes, wherein the water-porous structure is insertable narrow-end down into a sand boil formed in ground to allow water to flow from the ground through the mesh material and out the top of the sand boil, while blocking solid matter larger than the mesh holes from passing through the mesh material and out of the top of the sand boil; and further comprising a restraining structure configured to restrain the water-porous structure from being lifted out of the sand boil, said restraining structure selected from the group consisting of (i) a restraining structure comprising a plurality of weighted objects placed within the hollow conical shape of the water-porous structure, wherein the weighted objects are sized to allow water and sediment smaller than the mesh holes to flow between the weighted objects and (ii) a restraining structure comprising arms that extend from the narrow end of the conical, water-porous structure beyond the wide end of the conical, water-porous structure to engage with the ground adjacent to the sand boil and wherein the restraining structure is configurable in a closed configuration in which the water-porous structure has a collapsed, non-conical shape.

2. The filter of claim 1, wherein the plurality of weighted objects comprises gravel.

3. The filter of claim 1, wherein the arms are spring-tensioned.

4. The filter of claim 1, wherein the water-porous structure is collapsible for storage.

5. The filter of claim 4, wherein the mesh material is made of a flexible fabric.

6. The filter of claim 4, further comprising a spring-tensioned mechanism that provides the water-porous structure with its hollow conical shape.

7. A method for slowing or preventing a sand boil formed in ground from growing or further eroding sediment, the method comprising:
    allowing water to flow rising from the ground through a mesh material of a hollow, conical, water-porous structure of a sand-boil filter after the water-porous structure has been inserted narrow-end down into the sand boil, the mesh material having a plurality of spaced mesh holes; and
    blocking, by the mesh material, solid matter larger than the mesh holes from passing from the ground through the mesh material and out of the top of the sand boil.

8. The method of claim 7, further comprising using restraining structure configured to inhibit the water-porous structure from being lifted out of the sand boil.

9. The method of claim 8, wherein the restraining structure comprises arms that extend from the narrow end of the conical, water-porous structure beyond the wide end of the conical, water-porous structure to engage with the ground adjacent to the sand boil.

10. The method of claim 7, wherein the water is allowed to flow from the ground through the mesh material and through a plurality of weighted objects placed within the hollow, conical, water-porous structure, wherein the weighted objects are sized to allow the water to flow between the weighted objects.

11. The method of claim 10, wherein the plurality of weighted objects comprises gravel.

12. A method for a sand boil formed in ground, the method comprising:
    identifying the boil; and
    inserting, narrow-end down into the opening of the sand boil, a water-porous structure having a hollow conical shape and made of a mesh material having a plurality of spaced mesh holes, wherein the water-porous structure allows water to flow from the ground through the mesh material and out the top of the sand boil, while blocking, by the mesh material, solid matter larger than the mesh holes from passing from the ground through the mesh material and out of the top of the sand boil.

13. The method of claim 12, wherein restraining structure is configured to inhibit the water-porous structure from being lifted out of the sand boil.

14. The method of claim 13, wherein the restraining structure comprises arms that extend from the narrow end of the conical, water-porous structure beyond the wide end of the conical, water-porous structure and engage with the ground adjacent to the sand boil.

15. The method of claim 12, further comprising placing a plurality of weighted objects within the hollow, conical, water-porous structure, wherein the weighted objects are sized to allow water to flow between the weighted objects.

16. The method of claim 15, wherein the plurality of weighted objects comprises gravel.

\* \* \* \* \*